(12) United States Patent
Wang (10) Patent No.: US 11,839,922 B2
(45) Date of Patent: Dec. 12, 2023

(54) ROUTER BIT WITH INDEXING FEATURE

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 17/308,744

(22) Filed: May 5, 2021

(65) Prior Publication Data

US 2022/0355396 A1  Nov. 10, 2022

(51) Int. Cl.
*B23C 3/12* (2006.01)
*B27G 5/04* (2006.01)
*B23C 5/06* (2006.01)

(52) U.S. Cl.
CPC .................. *B23C 5/06* (2013.01); *B23C 3/12* (2013.01); *B23C 3/126* (2013.01); *B27G 5/04* (2013.01)

(58) Field of Classification Search
CPC ..... B23C 5/1054; B23C 5/109; B23C 5/1081; B23C 5/26; B23C 5/06; B23C 3/12; B23C 3/122; B23C 3/126; B23C 2200/16; B23C 2200/20; B23C 1/20; B27G 13/12; B27G 13/14; B27G 13/005
See application file for complete search history.

(56) References Cited

U.S. PATENT DOCUMENTS

| | | | | |
|---|---|---|---|---|
| 1,172,776 A * | 2/1916 | Engler | ................... | B27G 13/10 144/231 |
| 3,381,728 A * | 5/1968 | Goldstein | ................. | B27F 5/12 144/228 |
| 3,701,188 A * | 10/1972 | Wall | ........................ | B23B 51/08 144/240 |
| 5,433,563 A * | 7/1995 | Velepec | ................. | B27G 13/14 409/234 |
| 5,468,100 A * | 11/1995 | Naim | .................... | B27G 13/007 409/234 |
| 5,499,667 A * | 3/1996 | Nakanishi | .............. | B27G 13/14 144/353 |
| 5,593,253 A * | 1/1997 | Pozzo | ..................... | B23C 5/109 407/54 |
| 5,615,718 A * | 4/1997 | Venditto | .............. | B23Q 35/104 144/135.2 |
| 5,662,435 A * | 9/1997 | Sherman | ................ | B27G 13/12 407/56 |
| 6,688,351 B2 * | 2/2004 | Stager | ................... | B27G 13/007 144/237 |
| 7,036,539 B2 * | 5/2006 | Sherman | .................. | B27G 3/00 407/56 |
| 7,131,473 B1 * | 11/2006 | Brewer | ...................... | B23C 5/26 409/203 |
| 7,150,589 B2 * | 12/2006 | Nordlin | ................. | B23B 51/101 144/237 |
| 7,171,760 B1 * | 2/2007 | Lemon | ................. | B23D 59/002 33/833 |
| 7,226,257 B2 | 6/2007 | Lowder et al. | | |
| 7,260,897 B1 | 8/2007 | Neff | | |
| 7,448,419 B1 | 11/2008 | Sommerfeld | | |
| 8,235,080 B2 * | 8/2012 | Lee | ...................... | B27G 13/007 144/240 |

(Continued)

*Primary Examiner* — Nicole N Ramos
(74) *Attorney, Agent, or Firm* — Wolter Van Dyke Davis, PLLC; Robert L. Wolter (57) ABSTRACT

A router bit (100), including: a shank (104) that defines a longitudinal axis (106); a cutter (110); a body (112) that secures the cutter to the shank; and a recess (120) in the body that is disposed between axial ends (122, 124) of the cutter, and that includes an indexing feature (126).

12 Claims, 12 Drawing Sheets

(56) References Cited

U.S. PATENT DOCUMENTS

| | | | | |
|---|---|---|---|---|
| 9,682,492 | B1* | 6/2017 | Schaffter | B23Q 17/2233 |
| 2003/0072624 | A1* | 4/2003 | Dollar | B23C 5/1081 |
| | | | | 407/30 |
| 2004/0126197 | A1* | 7/2004 | Allemann | B27G 13/002 |
| | | | | 409/130 |
| 2007/0217873 | A1* | 9/2007 | Martin | B23C 5/109 |
| | | | | 407/113 |
| 2008/0170917 | A1* | 7/2008 | Hilker | B23C 5/1054 |
| | | | | 407/54 |
| 2008/0240869 | A1* | 10/2008 | Hall | B23C 5/1081 |
| | | | | 407/32 |
| 2010/0122752 | A1* | 5/2010 | Lee | B27G 13/007 |
| | | | | 407/57 |
| 2014/0290798 | A1* | 10/2014 | Hilker | B27G 13/005 |
| | | | | 144/219 |
| 2019/0321999 | A1* | 10/2019 | Wang | B27G 13/14 |

* cited by examiner

ROUTER BIT WITH INDEXING FEATURE

FIELD OF THE INVENTION

The invention relates to an indexing feature built into a router bit to aid in selecting a cutting height of the router bit relative to a work surface.

BACKGROUND OF THE INVENTION

Bits for shaping workpieces are typically installed in collets of machines that will spin the bits so the bits can shape a workpiece. The bit usually includes a shank that fits into a collet of the machine. Once the shank is inserted into the collet, the body of the machine can be vertically adjusted. Adjusting the vertical position of the body of the machine adjusts a height of a cutter of the bit relative to a surface on which the workpiece rests. Hence, adjusting the body of the machine adjusts a position of the cutter relative to the edge of the workpiece. Adjusting the position of the cutter enables the operator to properly align the cutter with the edge of the workpiece. Certain factors, including varying thicknesses of the workpieces, make proper alignment difficult. This is especially true for router bits having cutter profiles that are free of features that can be used as reference points to aid in the alignment of the cutter. Accordingly, there is room in the art for improvement.

BRIEF DESCRIPTION OF THE DRAWINGS

The invention is explained in the following description in view of the drawings.

DETAILED DESCRIPTION OF THE INVENTION

The present inventor has created a unique and innovative router bit with an indexing feature that enables accurate alignment of a cutter of the router bit with an edge of a workpiece. The indexing feature provides a reference point on the router bit that can be used to position the cutter of the router bit relative to a work surface. A workpiece will rest on the work surface during a routing operation. As such, positioning the indexing feature relative to the work surface naturally positions the indexing feature, and hence the cutter, relative to the workpiece.

Workpieces often vary in thickness throughout the workpiece and from one workpiece to another workpiece. As a result, router bits are often set up by aligning the center of the cutter with a midpoint of the workpiece being routed. As used herein, the center of the cutter is the axial center relative to a longitudinal axis of the shank of the router bit, between bitter ends of the cutter. The cutter is the part of the router bit having an edge that is a cutting edge. In the example embodiments disclosed herein, the machine is a router, however, the principles disclosed herein may be used with other machines. Since the workpiece will rest on a work surface when being routed, one simply needs to vertically position the body of the router so that the center of the cutter coincides with the center of the workpiece when the workpiece is on the work surface. To do this, one determines the thickness of the workpiece and divides that in half to get a "half thickness." The body of the router is then vertically adjusted so that the center of the cutter is disposed at a distance that puts it the half thickness above the work surface. When the workpiece is placed on the work surface, the midpoint of the workpiece will then coincide with the center of the cutter.

However, some cutters have a profile that does not have a discernable feature at the center that can be used as a reference point. Sometimes, for example, the cutter profile is smooth and angled (not perpendicular to the longitudinal axis) at the center of the cutter. Without a discernible reference point, proper alignment of the cutter is difficult and may require a hit or miss approach until the proper position is reached. The router bits disclosed herein have an indexing feature built into the router bit at a location other than the cutter itself such as the shank, or a body of the router which secures the cutter to the shank. The indexing feature can be used to position the cutter relative to the work surface and thereby properly align the cutter with the workpiece.

In example embodiments used herein, the indexing feature is located at the midpoint of the cutter. This simplifies the explanation because the midpoint of the cutter naturally coincides with the half thickness of the workpiece. However, the indexing feature can be located at any point between and including the bitter ends of the cutter. Stated another way, the indexing feature may be at a location that is offset from the axial center by an offset amount. If the offset is known, then the reference feature should be positioned at a distance from the work surface that is the half thickness plus (or minus) the offset. For example, the offset from the center of the cutter is 0.1" (toward the base of the shank that goes into the collet). If the half thickness of the workpiece is one half (½) an inch, the indexing feature will be located at 0.4" (the half thickness minus the offset) above the work surface. Hence, while embodiments discussed below place the indexing feature at the center of the cutter, the indexing feature can be at any location along the cutter. This allows for positioning of the indexing feature at alternate locations when, for example, it is relatively difficult or impossible to place the indexing feature at the center.

Figure 1:
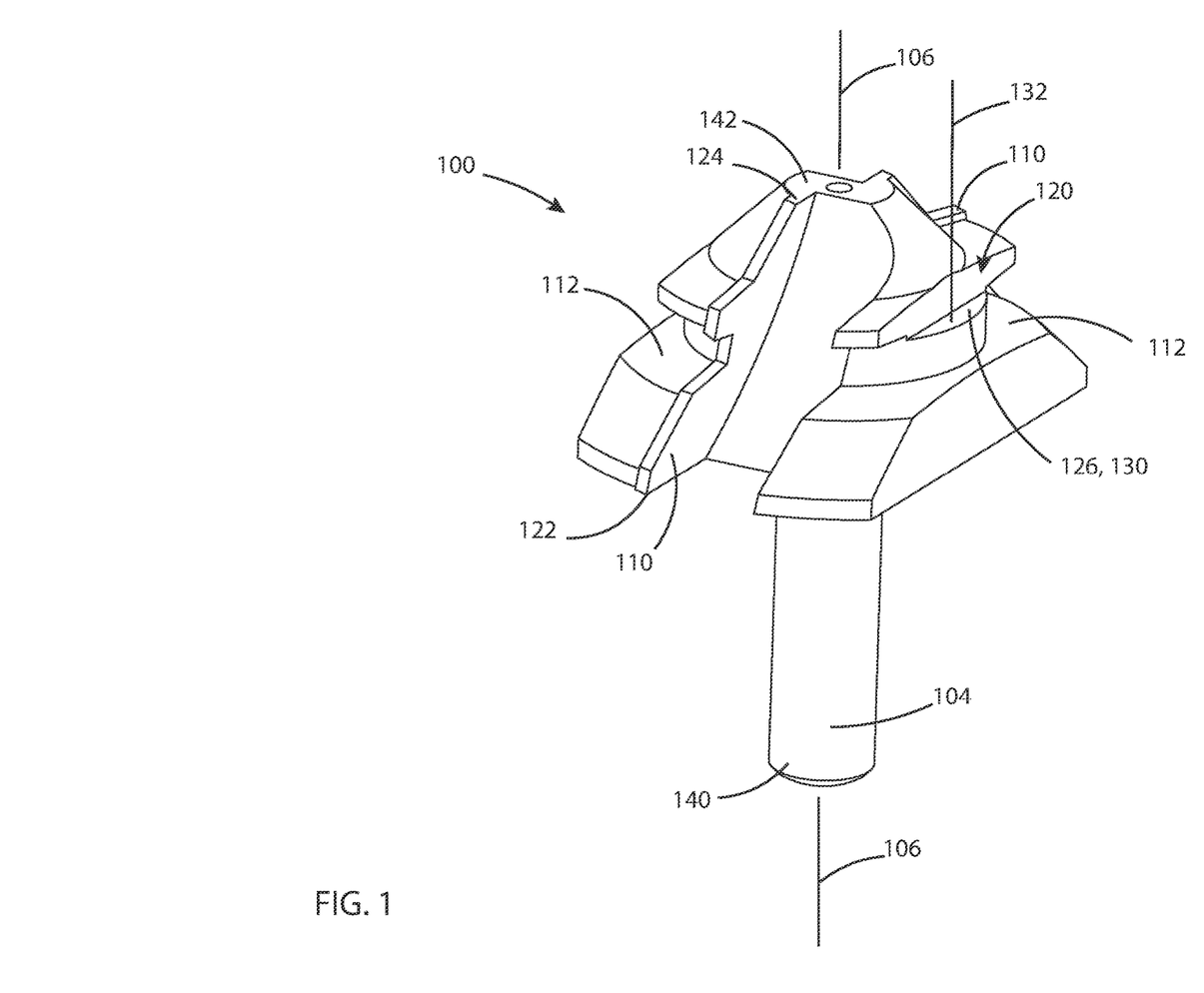
FIG. 1 is a perspective view of an example embodiment of a router bit with an example embodiment of an indexing feature.
Figure 2:
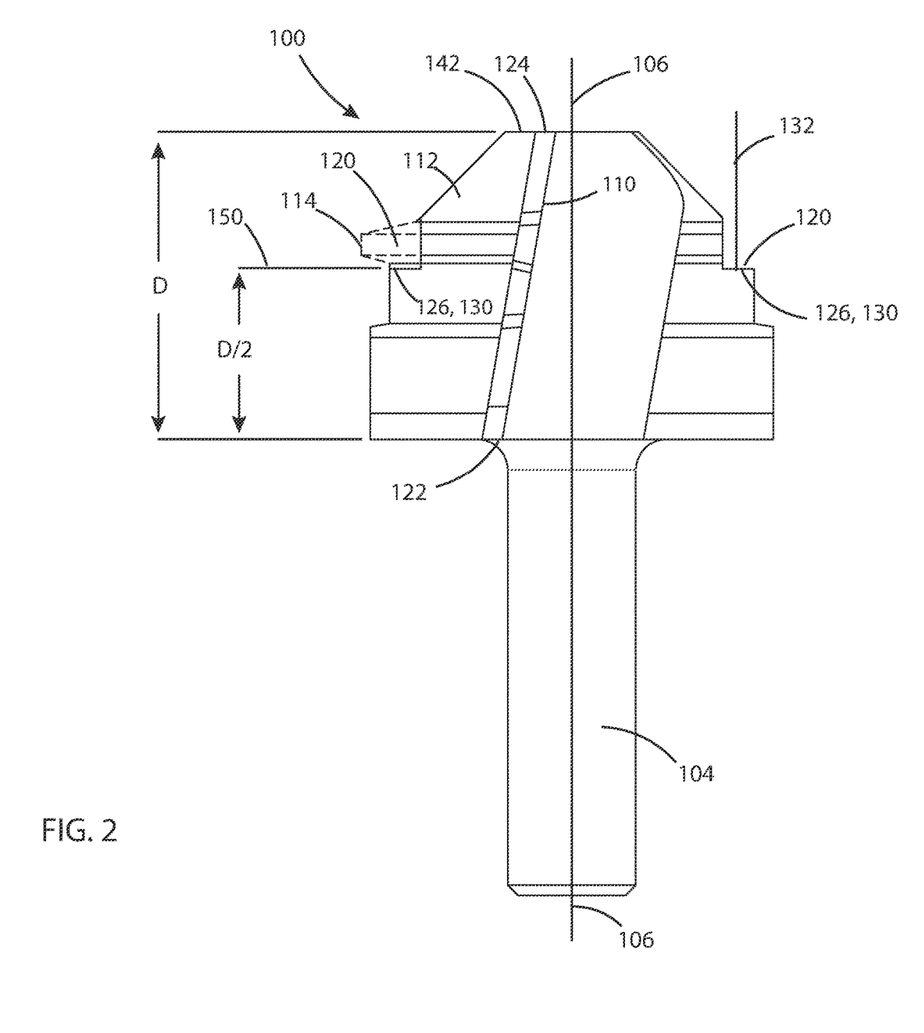
FIG. 2 is a side view of the router bit of FIG. 1.
Figure 3:
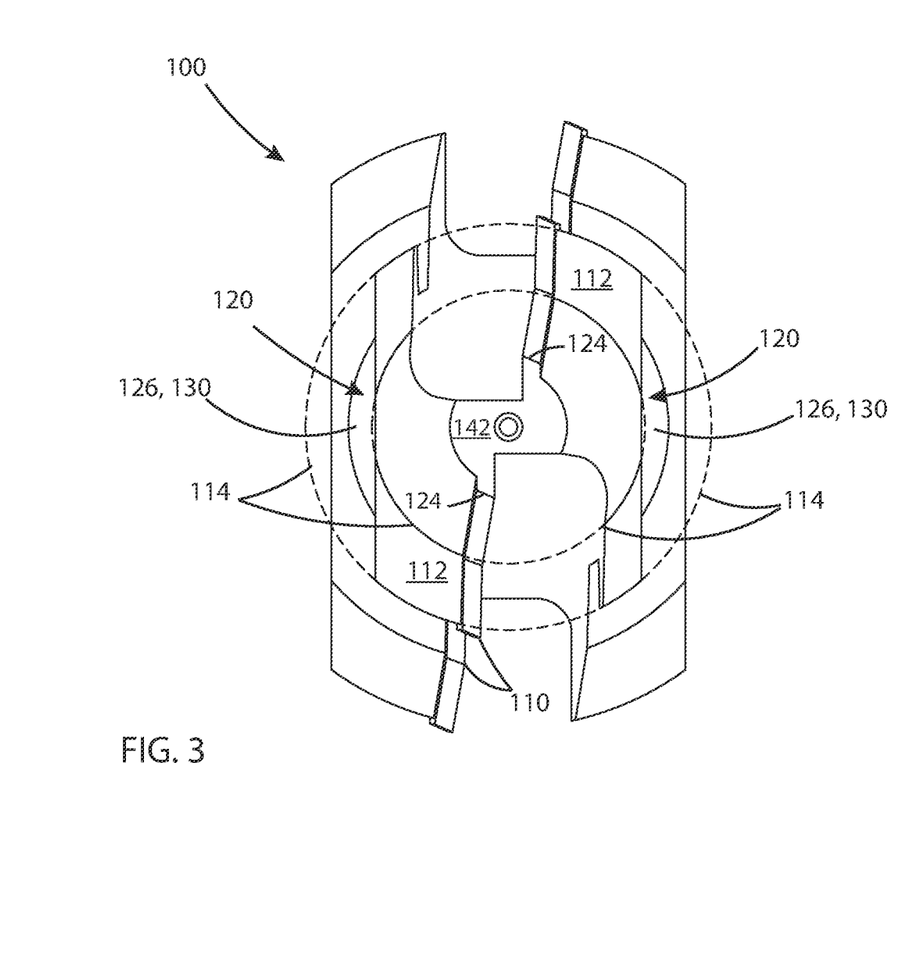
FIG. 3 is an end view of the router bit of FIG. 1.

FIG. 1 to FIG. 3 show an example embodiment of a router bit with an example embodiment of an indexing feature. The router bit 100 includes a shank 104 that defines a longitudinal axis 106, a cutter 110, and a body 112 that secures the cutter 110 to the shank 104. It is noted that the cutters 110 in the example embodiments of FIG. 1 to FIG. 3 are identical, though this need not be the case. When spun about the longitudinal axis 106, the body 112 defines a sweep 114.

As used herein, a sweep is a (hollow) shape made by a radially outer boundary of the object making the sweep. As best seen in FIG. 2, a recess 120 is locally recessed into the body 112 relative to the sweep 114 of the body 112. The recess 120 is disposed between a collet bitter end 122 of the cutter 110 and a tip bitter end 124 of the cutter 110 and comprises an indexing feature 126. It should be noted that the sweep of the body 112 is set back from an edge and corresponding sweep (not shown) of the cutter 110. This is because the radial outer boundary of the cutter 110 is naturally radially farther out than that of the body 112. As can be best seen in FIG. 3, there may be more than one recess 120 and associated indexing feature 126. This may, for example, provide better symmetry and associated balance to the router bit 100. However, symmetry is not necessary. Instead, there may be one, or any number more than one of the indexing features 126.

In this example embodiment, the indexing feature 126 is embodied as a flat surface 130 oriented perpendicular to the longitudinal axis 106. Since it is perpendicular to the longitudinal axis 106, a normal 132 of the flat surface 130 is parallel to the longitudinal axis 106. A flat surface 130 is suitable as a reference surface for gauges that are measuring from the work surface because the gauge can land on any part of the flat surface 130 and still get the same distance measurement.

In the example embodiment shown, a proximate end 140 of the router bit 100 is configured to be inserted into a router, and the flat surface 130 faces a distal end 142 of the router bit 100 that is opposite the proximate end 140. As best seen in FIG. 2, the indexing feature 126 is located at a midpoint 150 (D/2, a.k.a. the center) between collet bitter end 122 of the cutter 110 and a tip bitter end 124 of the cutter 110. In this example embodiment, the router bit 100 is configured to cut a lock miter joint, but other router bits may be used.

As noted above, the recess 120 may be located at a non-zero offset from the midpoint 150. Moreover, the indexing feature 126 may be different than a flat surface (e.g., a corner) as is detailed below. The indexing feature 126 may alternately axially coincide with a feature of a sweep formed by the cutter profile such as an inflection point etc. as is detailed below.

Figure 4:
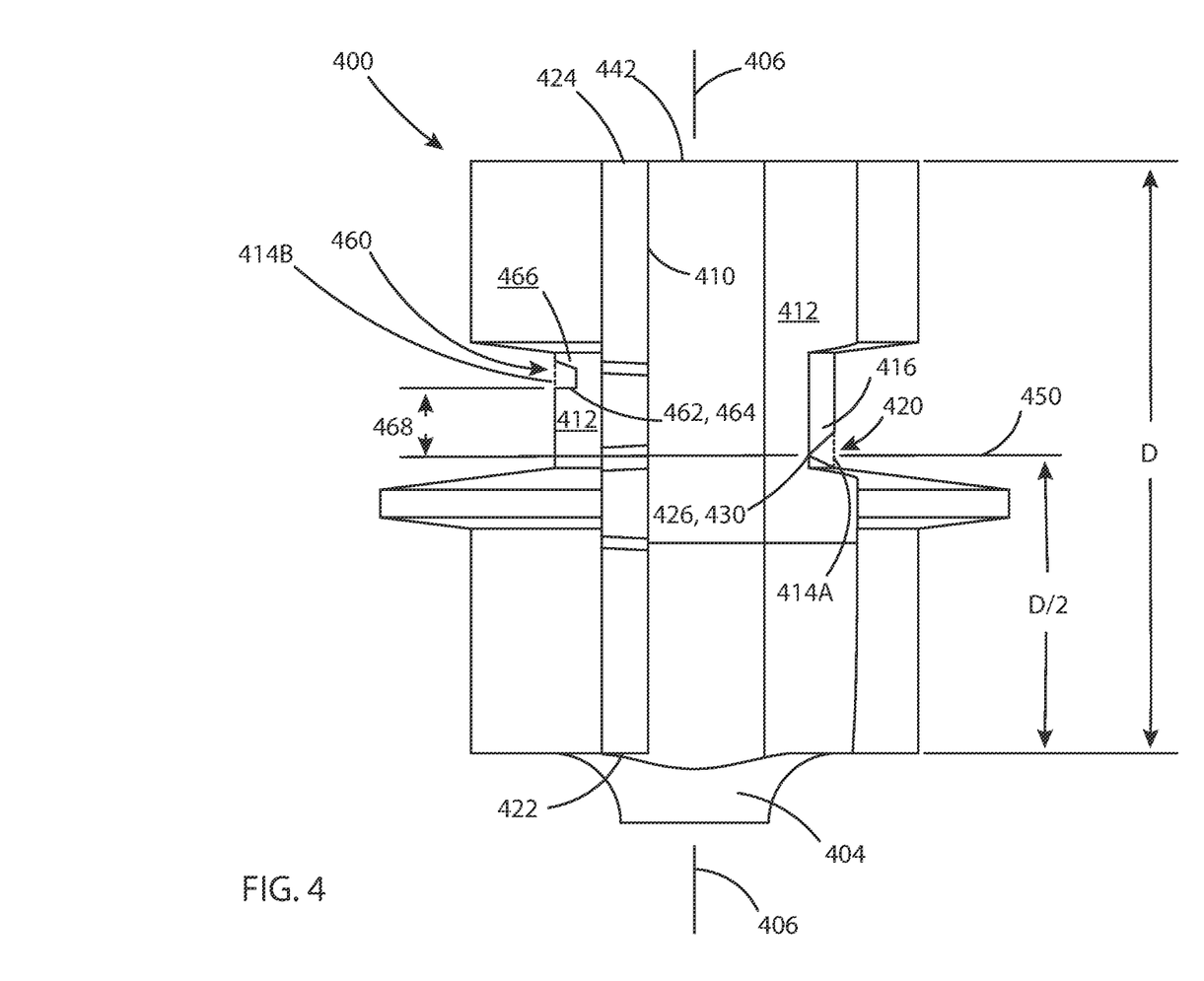
FIG. 4 is a side view of an alternate example embodiment of a router bit with example embodiments of the indexing feature.

FIG. 4 is a side view of an alternate example embodiment of a router bit with example embodiments of the indexing feature. The router bit 400 includes a shank 404 that defines a longitudinal axis 406, a cutter 410, a body 412 that secures the cutter 410 to the shank 404, a collet bitter end 422 of the cutter 410, a tip bitter end 424 of the cutter 410, a proximate end (not visible) of the router bit 400, and a distal end 442 of the router bit 400 that is opposite the proximate end 440.

A first recess 420 includes an indexing feature 426 embodied as a corner 430 of the first recess 420 and disposed at the midpoint 450 (D/2, a.k.a. the center) between collet bitter end 422 of the cutter 110 and a tip bitter end 424 of the cutter 410. The first recess 420 is recessed both from a sweep 414A of the body 412 and recessed from a local surface 416 of the body 412 surrounding the first recess 420. An indexing feature 426 embodied as a corner is suitable for a gauge with a pointed pointer. The pointed pointer may interlock/cooperate with the corner 430 so the router bit 400 can be accurately positioned.

A second recess 460 includes an indexing feature 462 embodied as a flat surface 464. The second recess 460 is recessed both from a sweep 4148 of the body 412 and recessed from a local surface 466 of the body 412 surrounding the first recess 420. The second recess 460 is disposed at an offset 468 from the midpoint 450 (D/2, a.k.a. the center) between collet bitter end 422 of the cutter 110 and a tip bitter end 424 of the cutter 410. As this example embodiment shows, there may be more than one indexing feature on a router bit, they may be at the same or different axial locations, and they may have the same or different shapes. Further, the indexing features may be at different radial distances from the longitudinal axes 406.

FIG. 5 to FIG. 9 show various example embodiments a router bit with example embodiments of the indexing feature. In these example embodiments, the router bit is configured to cut a butterfly shape, but the indexing features can be used with router bits configured to cut other shapes. The principles are discussed in depth with respect to FIG. 5 and apply to FIG. 5 to FIG. 9. The router bit 500 includes a shank 504 that defines a longitudinal axis 506, a cutter 510, a body 512 that secures the cutter 510 to the shank 504, a collet bitter end 522 of the cutter 510, a tip bitter end 524 of the cutter 510, a proximate end 540 of the router bit 500, and a distal end 542 of the router bit 500 that is opposite the proximate end 540.

Figure 5:
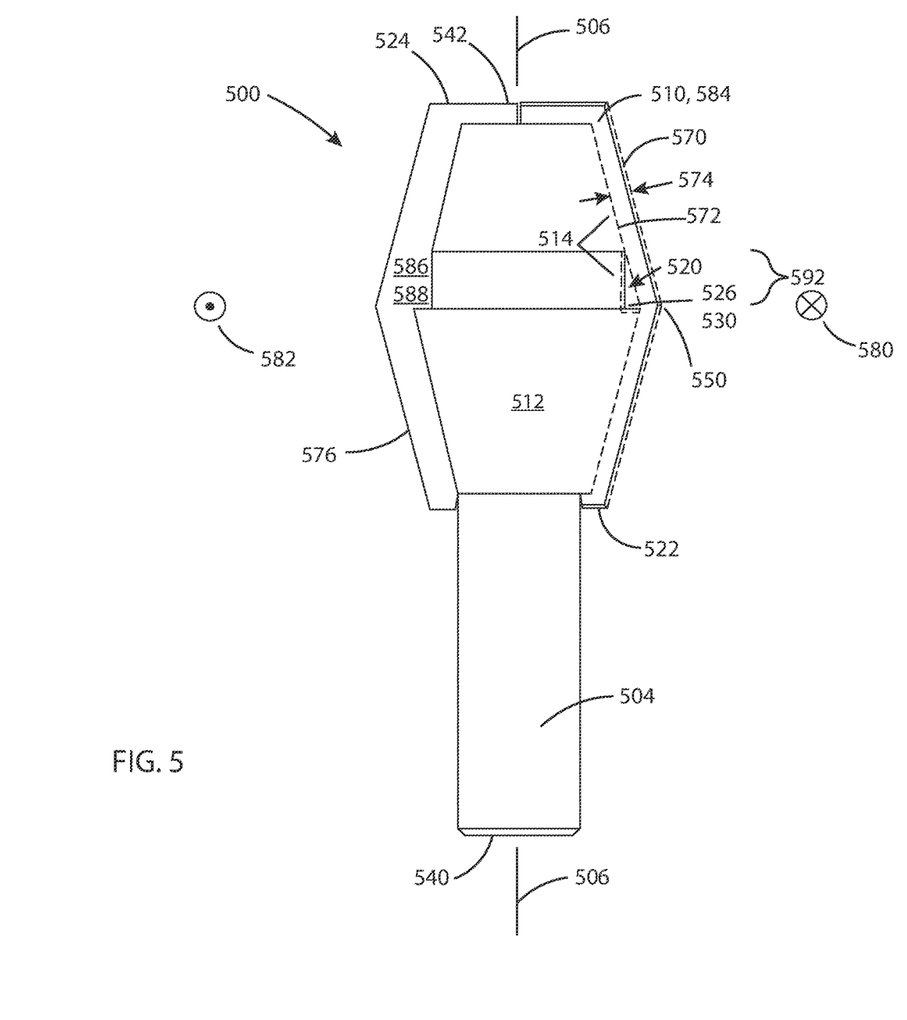
FIG. 5-9 are side views of various alternate example embodiments of a router bit with respective example embodiments of the indexing feature.

As shown in FIG. 5, the cutter 510 defines a cutter sweep 570 (shown under a dotted line) when the router bit 500 a spun about the longitudinal axis 506. A design setback sweep 572 (shown under the dotted line) is set back by a setback 574 from the cutter sweep 570 and extends from one bitter end of the body 512 to the other bitter end of the body 512. The design setback sweep 572 follows a profile of the cutter sweep 570. The setback 574 may be the same amount or may vary in different sections of the design setback sweep 572. The design setback sweep 572 defines a body sweep of conventional router bodies. In other words, the radially outermost portion of the body of a conventional router bit follows the design setback sweep 572. The radially outermost portion of the body is that portion shown in FIG. 5 closest to a cutting edge of the cutter 510. As used herein, follows can mean that for every feature in the shape of the cutter sweep 570 there is a corresponding feature in the shape of the design setback sweep 572, even if the relationship includes a variation in the magnitude of the setback 574. Likewise, for every feature in the shape of the design setback sweep 572, there is a feature corresponding feature in the shape of the cutter sweep 570.

As shown in FIG. 5, the cutter 510 rotates into the page on the right side as shown by arrow tail 580. Upon half a rotation the cutter 510 would be rotating out of the page on the left side as shown by arrowhead 582. The radially outermost portion of the body 512 (shown under the dotted/dashed lines) is disposed on a back/support side 584 of the cutter 510 that is opposite a cutting face (not visible) of the cutter 510. The radially outermost portion of the body 512 exists to provide support to the cutter 510 as the cutter 510 cuts the workpiece. The rest of the body 512 may or may not taper radially inward with circumferential distance toward the cutter face 586 of a second cutter 588. In the example embodiment shown in FIG. 5, the body 512 does taper radially inward. This creates a larger setback 576 at the cutter face 586 of the second cutter 588 which helps ensure the body 512 is clear material being removed from the workpiece. It is noted that the cutters 510, 588 in the example embodiments of FIG. 5 to FIG. 9 are identical, though this need not be the case.

Unlike conventional router bits where the body sweep is controlled by (e.g., follows) the design setback sweep 572, in this example embodiment, the body sweep 514 includes a recess 520 locally recessed into the body 512 from the design setback sweep 572 in a portion 592 of the design setback sweep 572. Stated another way, unlike conventional router bits, the body sweep 514 in this example embodiment does not follow the entire design setback sweep 572. Instead, the body sweep 514 locally deviates from the design setback sweep 572 in portion 592 of the design setback sweep 572. In other words, the body sweep 514 includes at least one feature for which there is no corresponding feature in the cutter sweep 570.

The recess 520 includes the indexing feature 526. In the example embodiment shown in FIG. 5, the indexing feature 526 includes a flat surface 530 like the flat surface 130 of FIG. 1 to FIG. 3 that is perpendicular to the longitudinal axis 506 and that faces the distal end 542 of the router bit 500. In this example embodiment, the indexing feature 526 is located at the midpoint 550 between the proximate end 540 of the router bit 500, and the distal end 542 of the router bit 500. However, any location along the longitudinal axis 506 would suffice. The cutter 510 includes an inflection point 594 (e.g., a point/peak) at the midpoint 550, so the indexing feature 526 is coaxially located with the inflection point 594.

In a conventional router bit, since the body and body sweep follow the design setback sweep 572, the body sweep would have a point at the midpoint 550 that matches the point on the design setback sweep 572 and thereby the point on the cutter 510. However, as can be seen in FIG. 5, the body 512 and body sweep 514 have a point that is different from the point on the design setback sweep 572 and thereby the cutter 510. Specifically, the angle that defines the point on the body sweep 514 is half the angle that defines the point on the design setback sweep 572 and thereby the cutter 510. At the location of the indexing feature, the shape of the body sweep 514 is thereby naturally different than the shape of the design setback sweep 572, the cutter sweep 570, and the cutter 510.

Figure 6:
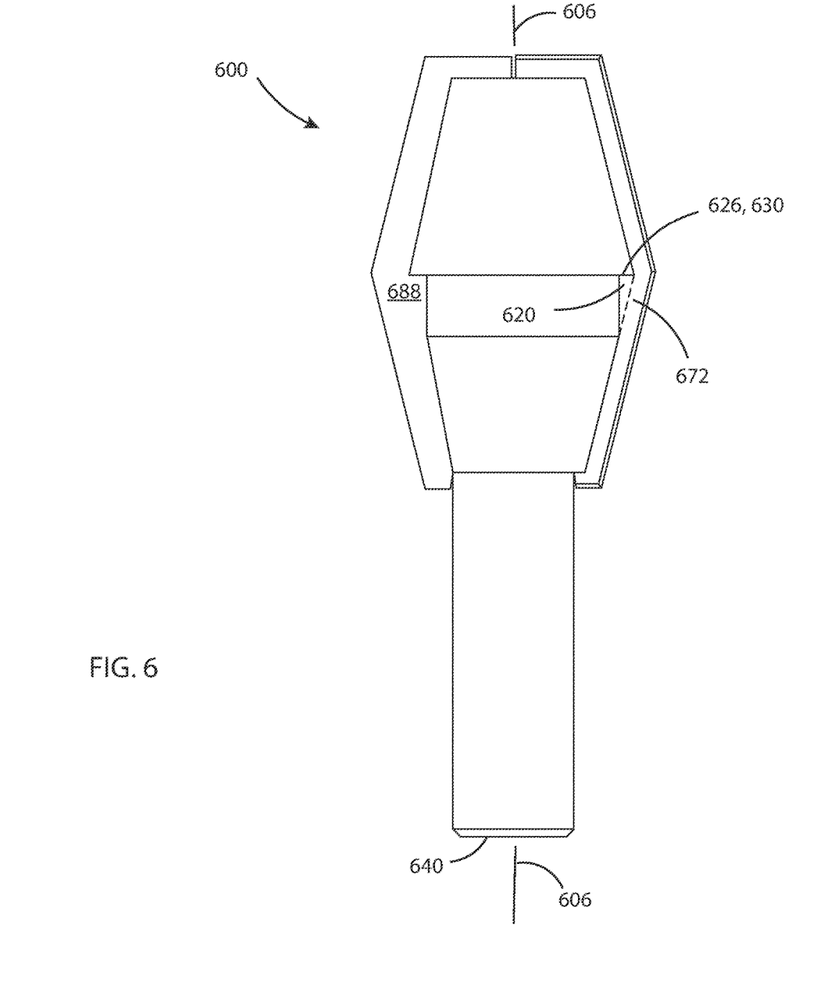

FIG. 6 shows an alternate example embodiment of a router bit 600 with a recess 620 and an indexing feature 626 embodied as a flat surface 630. The recess 620 of this example embodiment is recessed relative to the design setback sweep 672 and extends to the second cutter 688 similar to that of the example embodiment of FIG. 5. The flat surface 630 is perpendicular to the longitudinal axis 606, but in this example embodiment, the flat surface 630 faces toward the proximate end 640 of the router bit 600.

Figure 7:
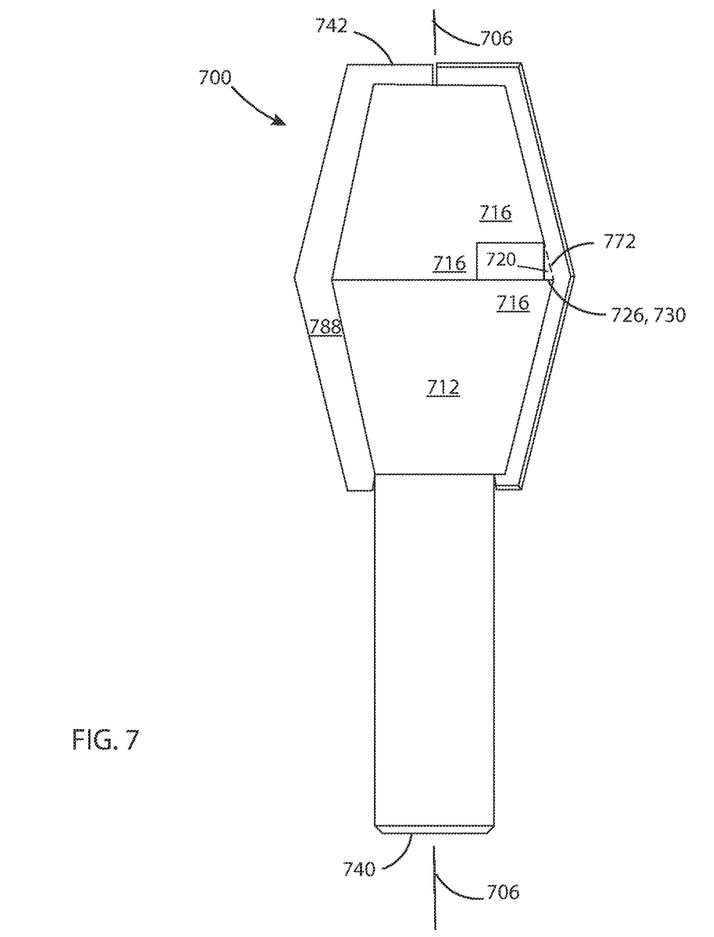

FIG. 7 shows an alternate example embodiment of a router bit 700 with a recess 720 and an indexing feature 726 embodied as a flat surface 730. The recess 720 of this example embodiment is recessed both relative to the design setback sweep 772 and locally relative to a local surface 716 of the body 712 surrounding the recess 720. The flat surface 730 is perpendicular to the longitudinal axis 706 and faces toward the distal end 742 (away from the proximate end 740) of the router bit 700. The recess 720 of this example embodiment does not extend all the way to the second cutter 788.

Figure 8:
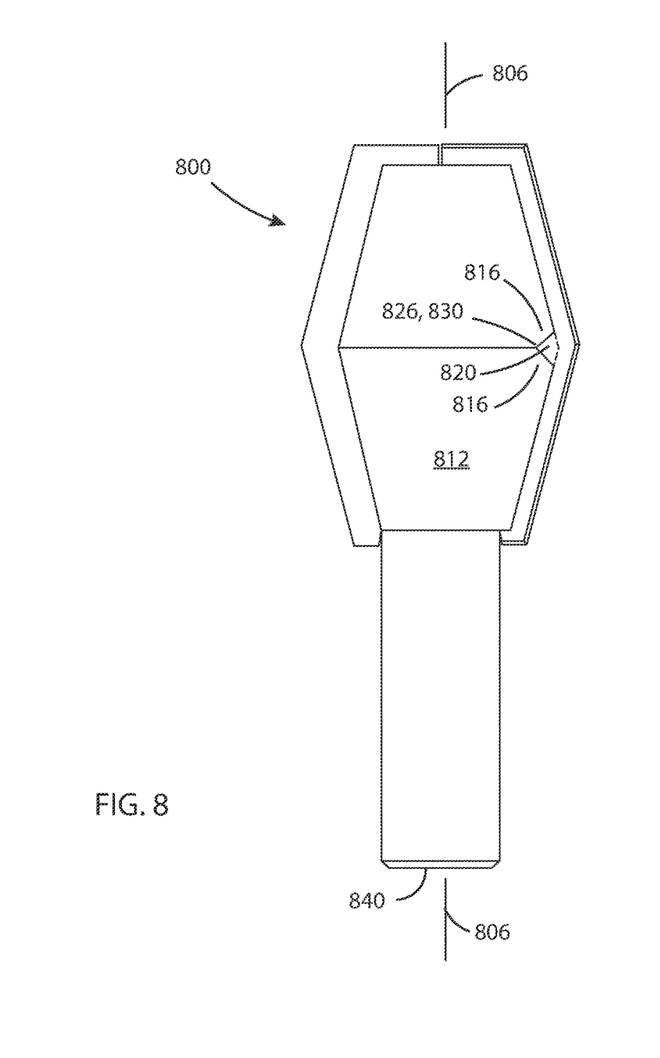

FIG. 8 shows an alternate example embodiment of a router bit 800 with a longitudinal axis 806 and a proximate end 840. The router bit 800 has a recess 820 that opens radially outward and an indexing feature 826 embodied as a corner 830. The recess 820 of this example embodiment is recessed both relative to the design setback sweep 872 and locally relative to a local surface 816 of the body 812 surrounding the recess 820.

Figure 9:
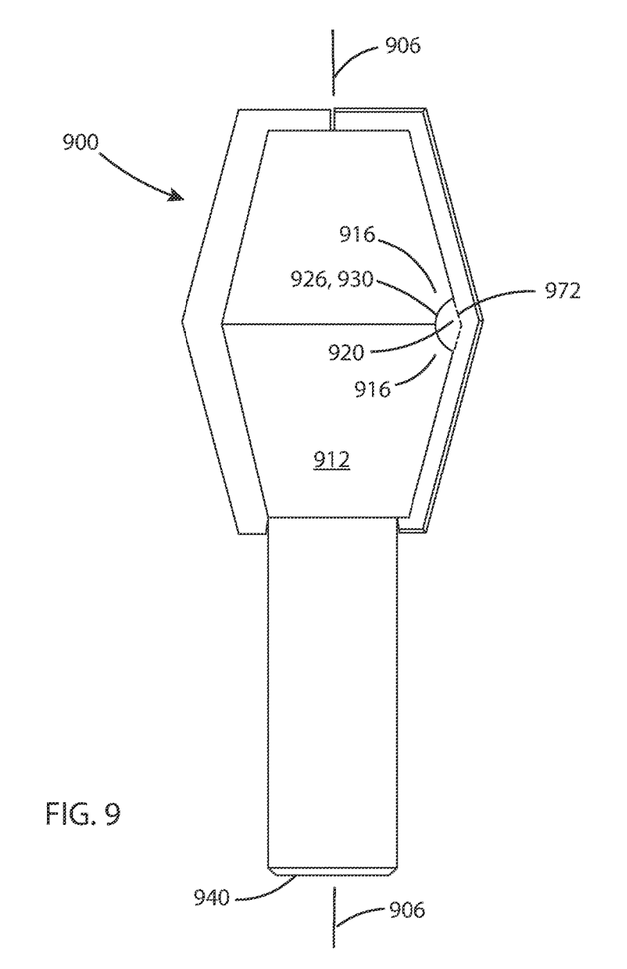

FIG. 9 shows an alternate example embodiment of a router bit 900 with a longitudinal axis 906 and a proximate end 940. The router bit 900 has a recess 920 that opens radially outward and an indexing feature 926 embodied as a curved surface 930. The recess 920 of this example embodiment is recessed both relative to the design setback sweep 972 and locally relative to a local surface 916 of the body 912 surrounding the recess 920. In this example embodiment, the indexing feature 926 is configured to cooperate with pointer of a measuring tool. Such cooperation aligns the pointer with the indexing feature by, for example, geometric cooperation therebetween. For example, the pointer may be shaped in a mirror/reverse shape of the indexing feature 926 so that the pointer has a convex surface that nests into the indexing feature 926. When the intended nesting is reached, the pointer is properly aligned with the indexing feature 926.

While the indexing feature 926 in this example embodiment has a concave curved shape, any shape can be used so long as a suitably shaped pointer can cooperatively interact with the indexing feature 926 to result in the proper alignment therebetween. Further, the pointer need not have the exact same shape as the indexing feature 926 to achieve the proper alignment. For example, the indexing feature 926 could be in the shape of a V-groove (e.g., FIG. 8) or have three sides of a square and the pointer could be shaped like a sphere and properly cooperate/fit therein to achieve the proper alignment.

Figure 10:
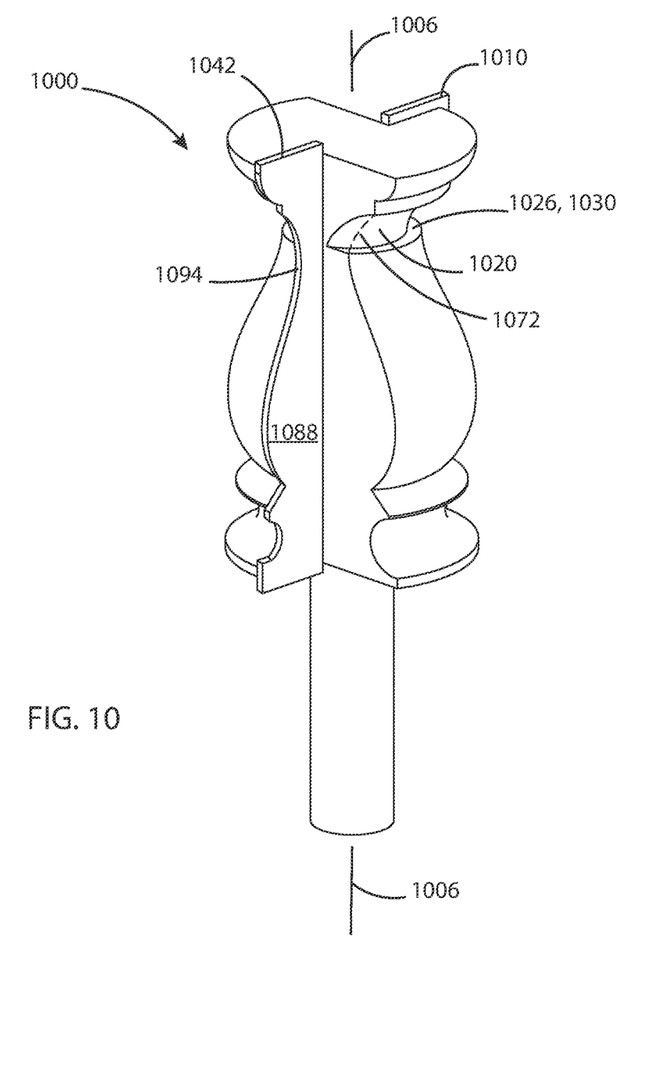
FIG. 10 is a perspective view of an alternate example embodiment of a router bit with an example embodiment of the indexing feature.

FIG. 10 shows an alternate example embodiment of a router bit 1000 with a recess 1020 and an indexing feature 1026 embodied as a flat surface 1030. The recess 1020 of this example embodiment is recessed relative to the design setback sweep 1072 and extends from the cutter 1010 to the second cutter 1088. The design setback sweep 1072 is shown here at the downstream/other end of the recess 1020 instead of at the cutter 1010. This is because in this example embodiment the body 1012 does not taper radially inward toward the second cutter 1088. As such, at a given location relative to the longitudinal axis 1006, the radially outer edge of the body 1012 remains at the same radial distance from the longitudinal axis 1006. The flat surface 1030 is perpendicular to the longitudinal axis 1006 and faces toward the distal end 1042 of the router bit 1000. The location of the indexing feature 1026 coincides with the location of an inflection point 1094 of a curve in the cutter 1010 and associated sweep formed by the cutter relative to the longitudinal axis 1006. It is noted that the cutters 1010, 1088 are identical in this example embodiment, so the inflection point 1094 on the second cutter 1088 coincides with a same inflection point on the cutter 1010.

Figure 11:
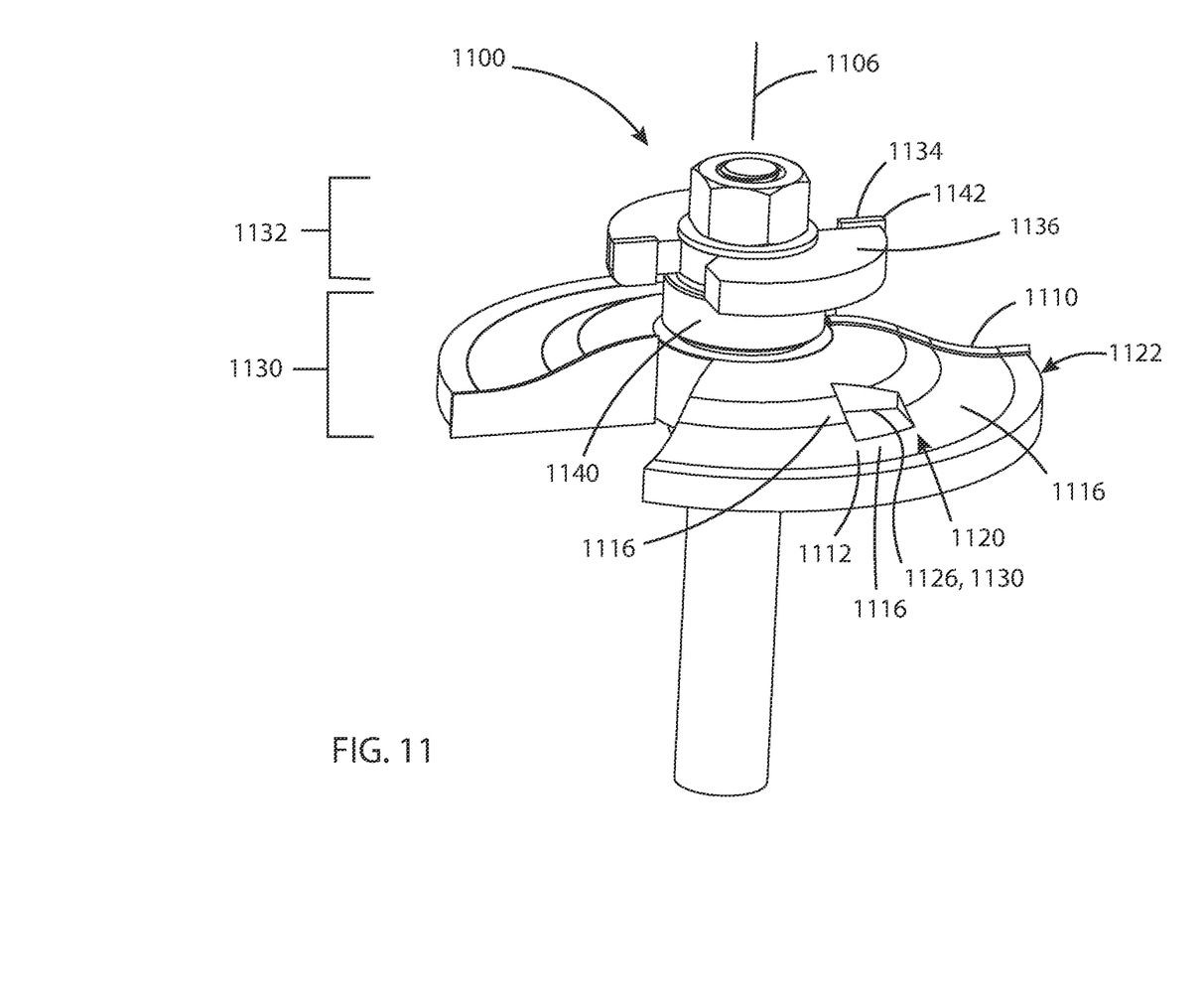
FIG. 11 is a perspective view of an alternate example embodiment of a router bit with an example embodiment of the indexing feature.

FIG. 11 shows an alternate example embodiment of a router bit 1100 with a recess 1120 that opens radially outward and an indexing feature 1126 embodied as a corner 1130. The recess 1120 of this example embodiment is recessed locally relative to the local surface 1116 of the body 1112 surrounding the recess 1120. The router bit 1100 has a first cutter/body arrangement 1130 with the cutter 1110 and the body 1112, and a second cutter/body arrangement 1132 having a second cutter 1134 and a second body 1136. The first cutter/body arrangement 1130 and the second cutter/body arrangement 1132 are discrete each other. The first cutter/body arrangement 1130 and the second cutter/body arrangement 1132 occupy discrete portions of the length of the router bit 1100 along the longitudinal axis 1106 and are separated by a bearing 1140 configured to roll on an edge of the workpiece between portions of the workpiece being routed. The location of the indexing feature 1126 can be selected to be a midpoint between bitter ends of the cutter 1110, or a midpoint with an offset as detailed above.

Alternately, the location of the indexing feature 1126 can be selected to be a midpoint between the collet bitter end 1122 of the cutter 1110 and a tip bitter end 1142 of the second cutter 1134. Likewise, the location of the indexing feature 1126 can be selected to be the midpoint between the collet bitter end 1122 of the cutter 1110 and the tip bitter end 1142 of the second cutter 1134 with an offset. The latter may be suitable in instances like that shown in FIG. 11, where it may be difficult or impossible to locate the indexing feature 1126 at the midpoint of both cutters 1110, 1142 due to the presence of the bearing 1140 or the like. Considering all the cutters on the router bit when choosing the location of the indexing feature 1126 allows for indexing relative to the entire cutting sweep/profile of the router bit 1100 instead of the cutting sweep/profile of one cutter of the router bit 1100.

In the embodiment shown in FIG. 11, the cutter 1110 is one of two cutters in the first cutter/body arrangement 1130. The two cutters are identical and hence interchangeable as used to this point. The same applies to the cutters of the second cutter/body arrangement 1132. However, it is possible that a single cutter/body arrangement can have two or more different cutters attached to the same body. For example, the different cutters may have different shapes at different axial locations. Alternately, or in addition, the different cutters may have different shapes but be at the same or overlapping axial positions. Such a cutter arrangement includes progressive cutters where each cutter cuts only a portion of the final profile that the router bit as a whole cuts. Applying the principles detailed above, the indexing feature can be located relative to the midpoint (with or without an offset) of any one of the cutters, relative to the midpoint (with or without an offset) of any combination of the cutters, and/or relative to the midpoint (with or without an offset) of all of the cutters taken as a whole.

Figure 12:
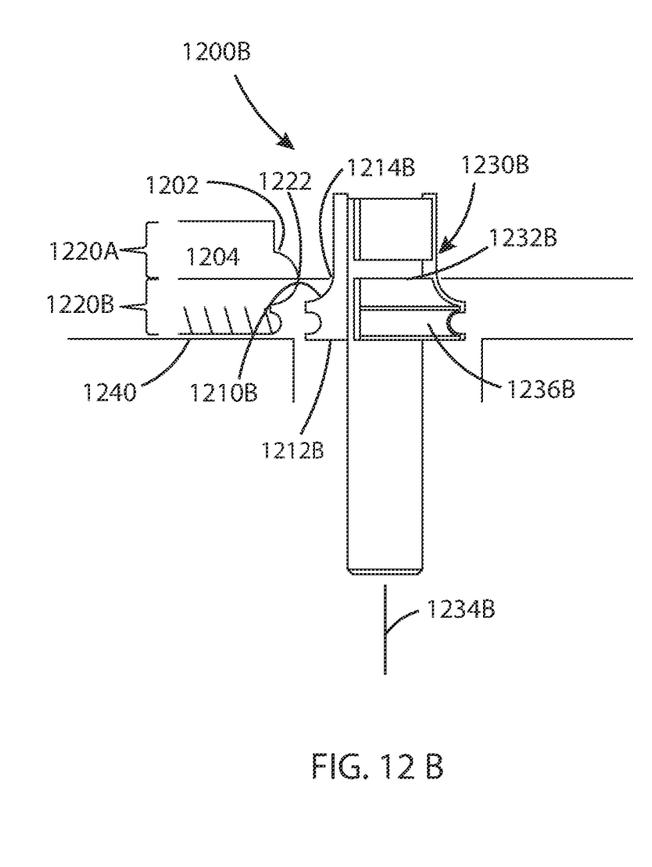
FIG. 12A is a side view of an example embodiment of a first cooperating router bit with an example embodiment of the indexing feature.
FIG. 12B is a side view of an example embodiment of a second cooperating router bit with an example embodiment of the indexing feature.

FIGS. 12A and 12B collectively depict the operation of a first router bit 1200A and a cooperating second router bit 1200B to form a single edge profile 1202 in a workpiece 1204. The first router bit 1200A defines a first cutter sweep 1210A from the collet bitter end 1212A to a reference location 1214A. The first cutter sweep 1210A routs a first half 1220A of the edge profile 1202 in the edge of the workpiece 1204.

The second router bit 1200B defines a second cutter sweep 1210B from the collet bitter end 1212B to a reference location 1214B. The second cutter sweep 1210B routs a second half 1220B of the edge profile 1202 in the edge of the workpiece 1204. A workpiece reference point 1222 is established in the edge profile 1202 to coincide with the reference location 1214A in the first router bit 1200A and the reference location 1214B in the second router bit 1200B.

The workpiece reference point 1222 may be expected to be at a particular location within the thickness of the workpiece 1204, (e.g., the midpoint, the ⅓ mark, the ¼ mark etc.). The reference location 1214A must be aligned with the workpiece reference point 1222 (e.g., the midpoint, the half thickness) before the first half 1220A can be routed. Then, to rout the second half 1220B, the reference location 1214B of the second router bit 1200B must be aligned with the workpiece reference point 1222, after which the second half 1220B can be routed. Such alignments can be tedious, difficult, and/or a hit or miss process.

In the example embodiment of FIGS. 12A and 12B, a recess 1230A having an indexing feature 1232A embodied as a flat surface that is perpendicular to the longitudinal axis 1234A is formed in the body 1236A. The recess 1230A of this example embodiment is recessed relative to the design setback sweep. The indexing feature 1232A is collocated with the reference location 1214A relative to the longitudinal axis 1234A. Accordingly, to align the first router bit 1200A, the half thickness of the workpiece 1204 is determined, and the indexing feature 1232A is merely located at a distance that corresponds to the half thickness from the work surface 1240. Once this is done, the first half 1220A can be routed.

Likewise, a recess 1230B having an indexing feature 1232B embodied as a flat surface that is perpendicular to the longitudinal axis 1234B is formed in the body 1236B. The recess 1230B of this example embodiment is recessed relative to the design setback sweep. The indexing feature 1232B is collocated with the reference location 1214B relative to the longitudinal axis 1234B. To align the second router bit 1200B, the half thickness of the workpiece 1204 is determined, and the indexing feature 1232B is merely located at a distance that corresponds to the half thickness from the work surface 1240. Once this is done, the workpiece 1204 is flipped over and the second half 1220B can be routed.

As detailed above, the indexing features 1232A, 1232B can be located at the midpoint or at the midpoint plus an offset. Hence, the indexing features 1232A, 1232B can be configured to associate with any workpiece reference point 1222, regardless of where in the thickness of the workpiece the workpiece reference point 1222 is located.

As has been disclosed above, the router bits and indexing features disclosed herein provide a quick, simple, and effective way of accurately aligning cutters of router bits with edges of workpieces in a way not previously possible. Consequently, this represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. A router bit, comprising:
    a longitudinal axis;
    a shank; and
    a body connected to the shank, the body and the shank extending along the longitudinal axis; and a cutter secured to the body;
    along the longitudinal axis, the cutter comprises: a miter profile, a groove profile and a tongue profile for cutting a miter;
    wherein the body comprises a portion having at least one recess, disposed at an axial position between the miter profile of the cutter and the shank; the at least one recess defining a flat indexing surface protruding radially outwards from a portion of the body, in relation to the longitudinal axis; and
    wherein when the router bit is rotated about the longitudinal axis, the body defines a body sweep, such that in a side view of the router bit, the at least one recess is recessed from the body sweep and in an end view of the router bit, the flat indexing surface of the recess protrudes radially outward in relation to at least a portion of the body.

2. The router bit of claim 1, wherein the flat indexing surface is oriented perpendicular to the longitudinal axis.

3. The router bit of claim 2, a normal of the flat indexing surface is parallel to the longitudinal axis.

4. The router bit of claim 1, wherein the flat indexing surface is located at a point that is equidistant from axial ends of the cutter.

5. A router bit, comprising:
- a longitudinal axis defining an axial direction extending from a distal end to a proximal end;
- a shank disposed closer to the proximal end; and
- a body connected to the shank and a cutter secured to the body;
- wherein the body comprises a substantially fructo-conical first portion at a position closer to the distal end, a central portion and a second portion at a position closer to the shank;
- wherein the cutter comprises: a miter profile disposed on at least the first portion, a groove profile and a tongue profile for cutting a miter; and
- wherein the central portion of the body defines at least one recess, disposed at an axial position between the first portion and the shank; and the at least one recess defining a flat indexing surface extending radially outwards in relation to the longitudinal axis such that in an end view of the router bit, the flat indexing surface of the recess protrudes radially outward in relation to the first portion.

6. The router bit of claim 5, wherein the flat indexing surface is oriented perpendicular to the longitudinal axis.

7. The router bit of claim 6, a normal of the flat indexing surface is parallel to the longitudinal axis.

8. The router bit of claim 5, wherein the flat indexing surface is located at a point that is equidistant from axial ends of the cutter.

9. A router bit, comprising:
- a longitudinal axis;
- a shank; and
- a body connected to the shank and extending along the longitudinal axis from a distal end to an axially opposite proximal end, the proximal end located closest to the shank;
- a cutter secured to the body; the cutter having a tip portion located closest to the distal end;
- wherein in a direction from the distal end to the proximal end, when the router bit is rotated about the longitudinal axis, the body defines a first body sweep at a first body portion, wherein a largest diameter of the first body sweep is disposed at a first radial distance from the longitudinal axis; and a second body sweep at a second body portion, wherein a largest diameter of the second body sweep is disposed at a second radial distance from the longitudinal axis, larger than the first radial distance; and
- wherein the body comprises a recess having a flat indexing surface extending radially outwards in relation to the longitudinal axis at a third radial distance, such that in an end view of the router bit, the third radial distance is larger than the first radial distance and smaller than the second radial distance.

10. The router bit of claim 9, wherein the flat indexing surface is oriented perpendicular to the longitudinal axis.

11. The router bit of claim 10, a normal of the flat indexing surface is parallel to the longitudinal axis.

12. The router bit of claim 9, wherein the flat indexing surface is located at a point that is equidistant from axial ends of the cutter.

* * * * *